(12) United States Patent
Duan et al.

(10) Patent No.: US 12,235,898 B2
(45) Date of Patent: *Feb. 25, 2025

(54) VIDEOCHAT

(71) Applicant: Microsoft Technology Licensing, LLC, Redmond, WA (US)

(72) Inventors: Nan Duan, Beijing (CN); Lei Ji, Beijing (CN); Ming Zhou, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,092

(22) Filed: Feb. 20, 2024

(65) Prior Publication Data
US 2024/0193208 A1 Jun. 13, 2024

Related U.S. Application Data

(63) Continuation of application No. 17/286,427, filed as application No. PCT/US2019/059292 on Nov. 1, 2019, now Pat. No. 11,921,782.

(30) Foreign Application Priority Data
Nov. 8, 2018 (CN) .......................... 201811327202.1

(51) Int. Cl.
G06F 16/70 (2019.01)
G06F 16/732 (2019.01)
G06F 16/735 (2019.01)
G06F 16/74 (2019.01)
G06F 16/783 (2019.01)

(52) U.S. Cl.
CPC ........ *G06F 16/7834* (2019.01); *G06F 16/732* (2019.01); *G06F 16/735* (2019.01); *G06F 16/745* (2019.01)

(58) Field of Classification Search
CPC .. G06F 16/7834; G06F 16/732; G06F 16/735; G06F 16/745
See application file for complete search history.

(56) References Cited

U.S. PATENT DOCUMENTS

| | | | |
|---|---|---|---|
| 9,852,646 B2* | 12/2017 | Kozloski | G09B 5/02 |
| 2008/0270138 A1* | 10/2008 | Knight | G06F 16/434 |
| | | | 704/E15.045 |
| 2017/0185675 A1* | 6/2017 | Arngren | G10L 19/018 |
| 2020/0110835 A1* | 4/2020 | Zhao | G06N 5/022 |

* cited by examiner

*Primary Examiner* — Kristopher Andersen
(74) *Attorney, Agent, or Firm* — Schwegman Lundberg & Woessner, P.A.

(57) ABSTRACT

The present disclosure provides a technical solution of multi-modal chatting, which may provide response to user query by using multi-modal response in the interaction between chatbot and human beings, so that the expressing ways and the expressed content by the chatbot could be richer by using such response in a multi-modal way.

20 Claims, 10 Drawing Sheets

VIDEOCHAT

CROSS REFERENCE TO RELATED APPLICATIONS

This application is a Continuation of U.S. application Ser. No. 17/286,427, filed Apr. 16, 2021, which is a U.S. National Stage Filing under 35 U.S.C 371 of International Patent Application Serial No. PCT/US2019/059292, filed Nov. 1, 2019, and published as WO 2020/096868 A on May 14, 2020, which claims priority to Chinese Application Serial No. 2018113272021 filed Nov. 8, 2018, which applications and publications are herein incorporated by reference in their entirety.

BACKGROUND

Chatbot is a kind of application (APP) or computer system for simulating conversation or chatting between human beings. With the development of the technology for processing languages, the chatbot has been widely used in various apps or intelligent devices to provide flexible ways of communication between human beings and machines. Nowadays, the ways of interactions between chatbots and human beings are mainly based on text or speech. It is difficult to express richer content due to the limitation by text and speech.

BRIEF SUMMARY

The embodiments of the present disclosure are provided to give a brief introduction to some concepts, which would be further explained in the following description. This Summary is not intended to identify essential technical features or important features of the subject as claimed nor to limit the scope of the subject as claimed.

The embodiments of the present disclosure may provide a technique for multi-modal chatting, which may provide response to user enquiry by using a way of multi-modal response in the interaction between chatbot and human beings. The expressing ways and the expressed content of the chatbot may be richer by using such response in a multi-model way.

The above description is merely a brief introduction of the technical solutions of the present disclosure, so that the technical means of the present disclosure may be clearly understood, and implemented according to the description of the specification, and the above and other technical objects, features and advantages of the present disclosure may be more obvious based on the embodiments of the present disclosure as follows.

DETAILED DESCRIPTION

Figure 1:
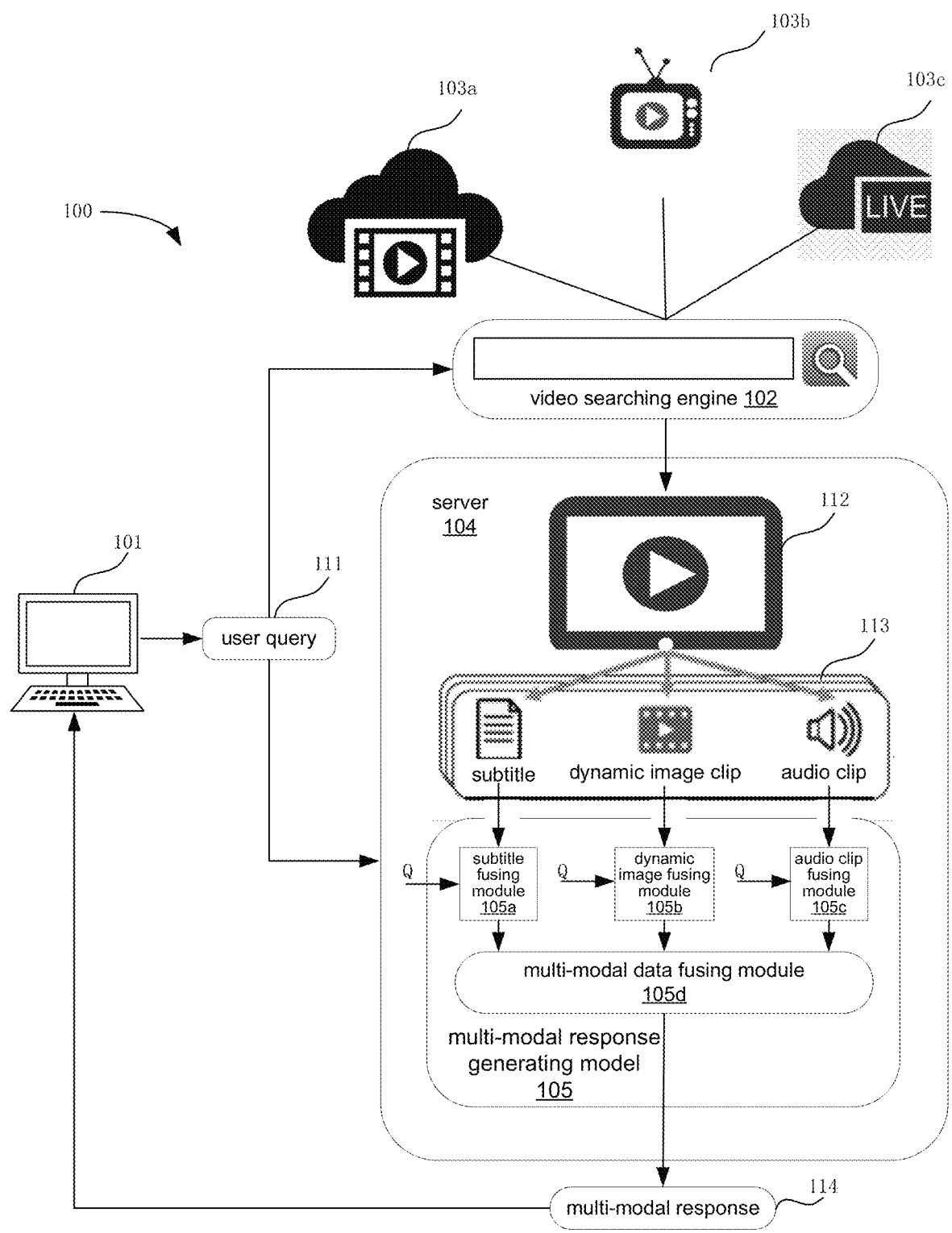
FIG. 1 is a schematic block diagram showing a scenario where a multi-modal response system is applied according to the embodiments of the present disclosure.

In the following, description will be given in detail on the exemplary embodiments of the present disclosure, in connection with the accompanying drawing. Although drawings show the exemplary embodiments of the present disclosure, it should be appreciated that the present disclosure may be implemented in various ways without being limited by the embodiments set forth herein. On the contrary, these embodiments are provided for thorough understanding of the present disclosure, and completely conveying the scope of the present disclosure to the skills in the art.

The following description sets forth various examples along with specific details to provide a thorough understanding of claimed subject matter. It will be understood by those skilled in the art, however, the claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof.

In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

It will be readily understood that the aspects of the present disclosure, as generally described herein, and illustrated in the figures, can be arranged, substituted, combined, and designed in a wide variety of different configurations, all of which are explicitly contemplated and make part of this disclosure.

The term "technique", as cited herein, for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or other technique(s) as permitted by the context above and throughout the document.

Overview

The embodiments of the present disclosure propose a technology for a chatbot to interact with users by using a multi-modal response. The modal cited therein may refer to the form for expressing content or information. One content may be expressed in a form of text message or in an audio form, or in a video form. The common form of multi-modal data may be e.g., video, which contains three forms for expressing the content of the three modals of dynamic images, audio and texts. When a chatbot receives a user query, the chatbot may select a clip of a video corresponding to the user query as a response. It should be noted that, the multi-modal cited above may be in a form other than the video, such as a form of a combination of audio and text, a form of dynamic images, a form of audio, a form of text and a form of barrage.

In the embodiments of the present disclosure, some multi-modal data may be obtained in advance and a single-modal data fusing processing including a similarity matching calculation may be performed on the user query and each single-modal data in the multi-modal data so as to generate a single-modal fused data. Then, the single-modal fused data corresponding to each modal may be subjected to a data re-fusing processing to generate a multi-modal fused data. A similarity between the user query and the whole multi-modal data may be contained in the multi-modal fused data. After the data fusing processing performed on each multi-modal data, a similarity between the user query and each multi-modal data may be obtained, and then, a ranking processing may be performed on the similarities so that a suitable multi-modal data may be selected for generating a response.

Detailed description may be made on technical solutions according to embodiments of the present disclosure in the following examples.

EXAMPLES

The following scenarios described below are merely examples without limiting each of the claims to any specific operating scenario. It is obvious that any other scenario may be used without departing from the spirit and range as claimed.

As shown in FIG. 1, which is a schematic block diagram 100 showing a scenario where a multi-modal response system is applied according to the embodiments of the present disclosure, the scenario shown in FIG. 1 may involve a multi-modal data of video, and a generated multi-modal response may also be output in a form of video clip. The whole multi-modal response system may mainly include a video searching engine 102 and a server 104 provided with a multi-modal response generating model 105. A user terminal 101 may send a user query 111 input by a user to the video searching engine 102 and the server 104 upon receiving the user query 111.

The video searching engine 102 may acquire video resources from various kinds of video sources. Such video sources may include an online video platform 103a, a tv broadcasting platform 103b, a live platform 103c or the like. When a video searching engine 102 receives a user query 111, the video searching engine 102 may perform searching in video sources so as to acquire videos 112 related to the user query 111 and provide the acquired videos 112 to the server 104. The video 112 may be a film, a documentary, a tv show, a live video clip, a lecture video, or the like.

In the server 104, the videos 112 may be subjected to the processing of clipping to generate a plurality of video clips. A multi-modal tuple 113 containing feature vectors corresponding to a dynamic image clip, an audio clip, and a subtitle may be generated based on each video clip. The multi-modal tuple may contain three kinds of single-modal data of dynamic image clip, audio clip, and subtitle. These three kinds of single-modal data are corresponding to the same video clip, and thus these three kinds of single-modal data may be actually correlated to each other. One video 112 may be clipped into a plurality of multi-modal tuples 113. It should be noted that, each single-modal data may be in a form of feature vector in the multi-modal tuple cited herein.

Such multi-modal tuples 113 may be input into a multi-modal response generating model 105, and meanwhile, a user query 112 is input into the multi-modal response generating model 105. In the embodiments of the present disclosure, the user query 112 is also in a form of feature vector when being subjected to the processing in the multi-modal response generating model 105. For convenient illustration, in the multi-modal response generating model 105, the user query 112 may be shown with a symbol "Q". Each single-modal data of the multi-modal tuple 113 may be input into a fusing module corresponding thereto. More particularly, a feature vector corresponding to the subtitle may be input into a subtitle fusing module 105a, a feature vector corresponding to the dynamic image clip may be input into a dynamic image fusing module 105b, and a feature vector corresponding to an audio clip may be input into an audio clip fusing module 105c. Meanwhile, a feature vector corresponding to the user query 112 may be input into the subtitle fusing module 105a, the dynamic image fusing module 105b, and the audio clip fusing module 105c. The subtitle fusing module 105a, the dynamic image fusing module 105b, and the audio clip fusing module 105c may perform a single-modal data fusing processing containing a similarity matching calculation respectively, so as to generate a single-modal fused data. Both the information on the user query 112 and each single-modal data and the information on similarity between the user query 112 and each single-modal data are contained in such single-modal fused data.

When the single-modal fused data corresponding to the dynamic image clip, the audio clip, and the subtitle are generated respectively, these kinds of three single-modal fused data may be input into a multi-modal data fusing module 105d for multi-modal data fusing processing, so that the three single-modal fused data are fused into a multi-modal fused data. The similarity information on similarity between the user query 112 and the whole multi-modal tuple 113 may be contained in the multi-modal fused data, and the information on similarity contained in the multi-modal fused data may show a comprehensive evaluation on the matching degree between the user query 112 and each of the three kinds of content of dynamic image clip, audio clip, and subtitle.

The multi-modal response generating model 105 described above may perform processing on a plurality of multi-modal tuples 113, which may be generated by the clipping processing on one complete video 112, respectively, to generate the similarity corresponding to each multi-modal tuple 113. One or more multi-modal tuples 113 on the top may be selected according to a similarity ranking mechanism so that a video clip may be acquired or a new video clip may be generated according to the selected multi-modal tuples 113 so that the acquired video clip or the generated new video clip may be output as a multi-modal response 114.

Figure 2:
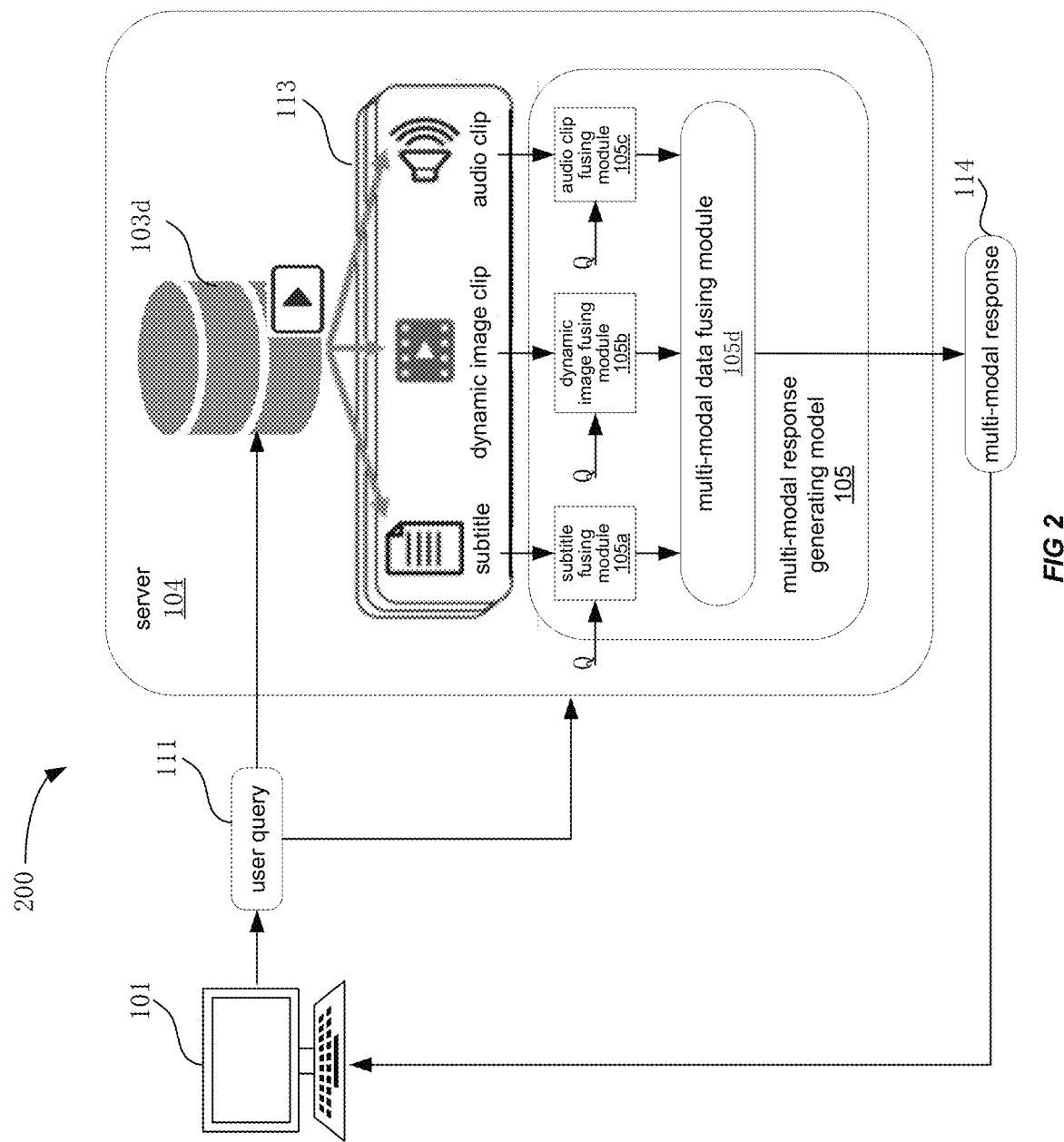
FIG. 2 is a schematic block diagram showing another scenario where a multi-modal response system is applied according to the embodiments of the present disclosure.

In the embodiments of the present disclosure, as shown in FIG. 2, which is a schematic block diagram 200 showing another scenario where a multi-modal response system is applied according to the embodiments of the present disclosure, the multi-modal tuple 113 may be acquired from a database 103d. The one providing the chatbot may perform processing on a huge amount of videos to generate the multi-modal tuples 113, which are saved in the database 103d. Furthermore, label information may be provided to the multi-modal tuples 113. When a user query 111 is acquired, searching may be performed in the database 103d to acquire the related multi-modal tuples 113 and the acquired multi-modal tuples 113 may be input into a multi-modal response generating model 105 so that a multi-modal response 114 may be generated.

Furthermore, the multi-modal response 114 may be generated by directly using the video clip corresponding to the multi-modal tuple 113, or by performing processing on the three kinds of single-modal data contained in the multi-modal tuple 113. For example, a summary information generated based on the three kinds of single-modal data may be output while the video clip is output. Furthermore, the multi-modal response 114 may contain the content of a plurality of multi-modal tuple 113, and thus the output may be in a form of combination of a plurality of video clips.

Figure 3:
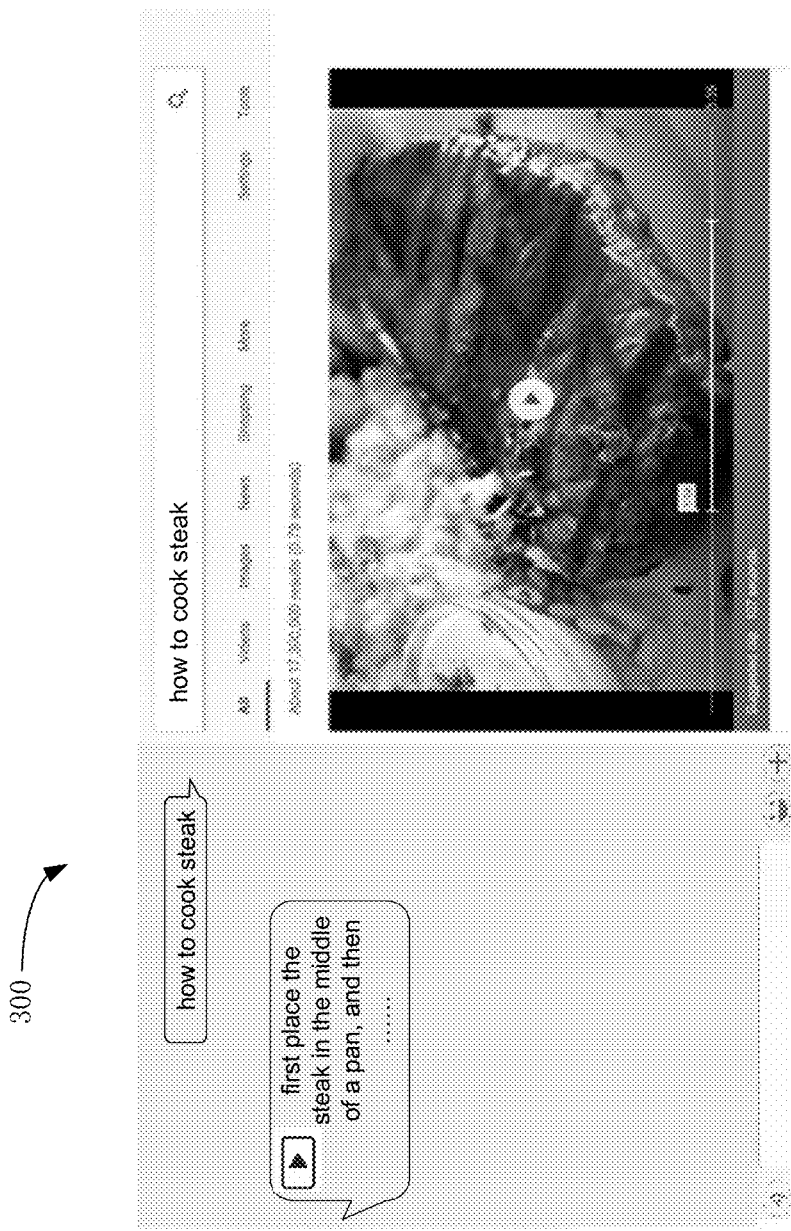
FIG. 3 is a schematic block diagram showing an interface of conversation using multi-modal response according to the embodiments of the present disclosure.

As shown in FIG. 3, which is a schematic block diagram 300 showing an interface of conversation using multi-modal response according to the embodiments of the present disclosure, a user inputs a message of "how to cook steak", and this message may be used as a user query 111 during the processing as shown in FIG. 1 or FIG. 2 to generate the multi-modal response 114. More particularly, the video clip may be sent to the user together with the summary. As shown in the chatting box on the left of FIG. 3, a chatbot may send a message as a response and the message may contain a linkage for playing a video and a brief description on the operations of "first place the steak in the middle of a pan, and then . . . " therein. When the user clicks the linkage for playing a video, the video playing interface on the right side of FIG. 3 may be shown. In this video playing interface, a video clip may be played for the user, and the video clip may be from a part of a video in a video source.

Furthermore, it should be noted that, the user terminal 101 shown in FIG. 1 and FIG. 2 as described above may be a small type portable (or mobile) electronic apparatus or provided in a small type portable (or mobile) electronic apparatus. The small portable (or mobile) electronic apparatus may be e.g., a cell phone, a personal digital assistant (PDA), a personal media player device, a wireless network player device, personal headset device, an IoT (internet of things) intelligent device, a dedicate device or combined device containing any of functions described above. The user terminal 101 described above may be implemented as a computing apparatus, such as a desktop computer, a laptop computer, a tablet, a specialized server, or provided therein. The server 104 described above may be a distributed server implemented via one or more computer systems or a cloud server based on the cloud architecture, or the server 104 may be a server in a local area network.

Examples of Implementations

Figure 4:
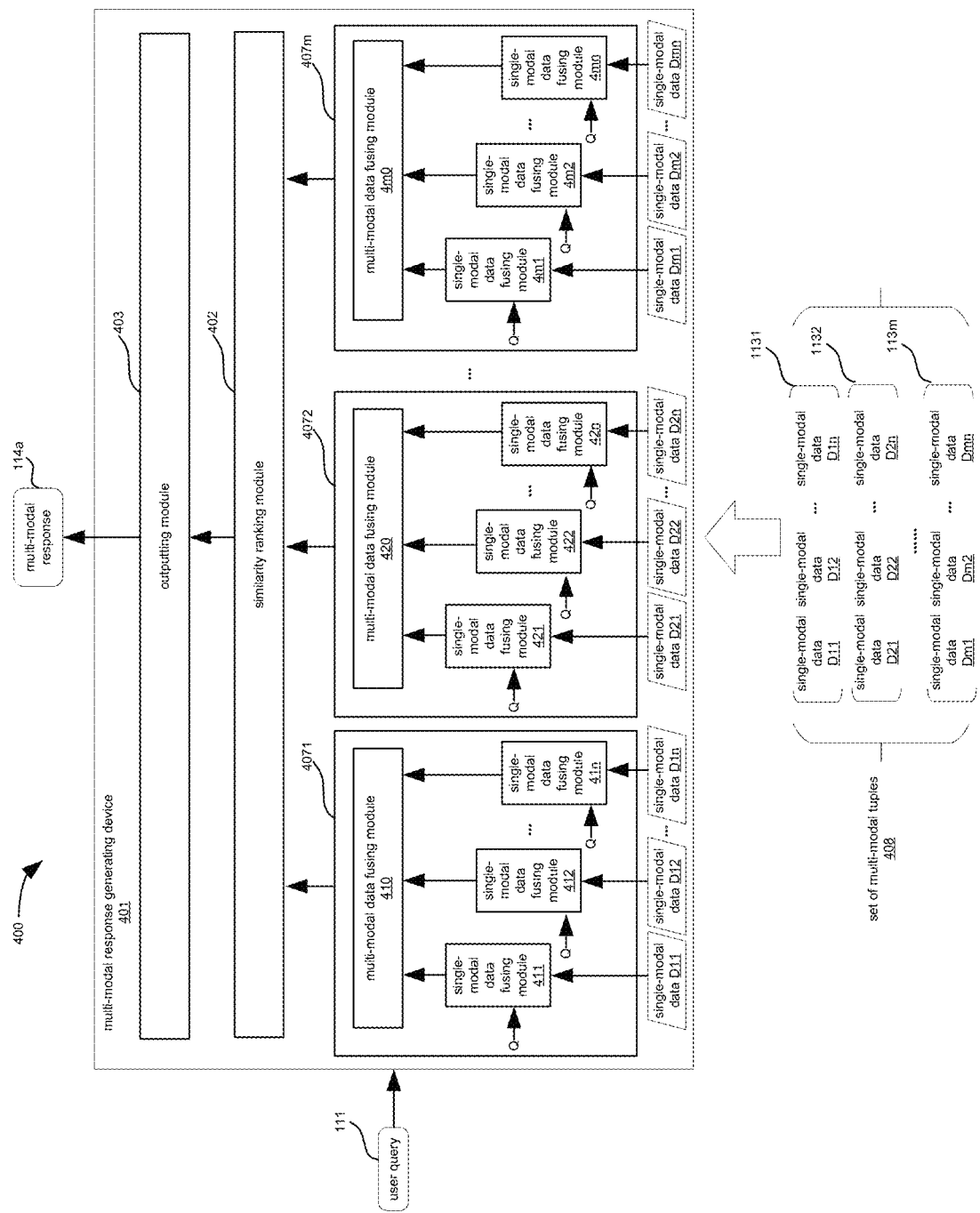
FIG. 4 is a schematic block diagram showing an exemplary multi-modal response generating device according to the embodiments of the present disclosure.

As shown in FIG. 4, which is a schematic block diagram 400 showing an exemplary multi-modal response generating device according to the embodiments of the present disclosure, the multi-modal response generating device 401 may include a single-modal data fusing module, a multi-modal data fusing module, a similarity ranking module 402, and an outputting module 403. More particularly, the number of the single-modal data fusing module may be corresponding to the number of the modals.

The multi-modal response generating device 401 may have an input data including a user query 111 and a set of multi-modal tuples 408 consisted of m multi-modal tuples 1131-113m. More particularly, the data in the user query 111 and the multi-modal tuples 1131-113m may be input into the multi-modal response generating device 401 in a form of feature vectors. More particularly, a inputting module may be provided in the multi-modal response generating device 401 to perform feature extracting on the input data so as to generate feature vectors.

As shown in FIG. 4, in each multi-modal tuple, single-modal data may be a data, which is paralleled with other single-modal data and having correlation relationship with other single-modal data. In the examples described with reference to FIG. 1 and FIG. 2, in a video clip, the dynamic image clip, the audio clip, and the subtitle are the data parallel with each other but have correlation relationship with each other. More particularly, the audio clip may be a voice of a character in the dynamic images clip, and the subtitle may be a text corresponding to the speech of a character or a text corresponding to voice-over for some scenario, or the like.

The single-modal data in each multi-modal tuple may be input into the multi-modal response generating device 401 parallelly. The modules contained in the blocks 4071-407m in the FIGS. may have the same structure and functions, and thus the modules in the blocks 4071-407m may be integrated together and perform processings on the input plurality of multi-modal tuples circularly. That is to say, the plurality of multi-modal tuples may be subjected to the processings by using the structure of the module in any block among the blocks 4071-407m. To better illustrate the processing on the plurality of multi-modal tuples by each module, the description may be made still by using the state in which the blocks 4071-407m are arranged in parallel as shown in FIG. 4.

With the block 4071 as an example, each single-modal data D11-D1n in the multi-modal tuple 1131 may be input into the corresponding single-modal data fusing modules 411-41n respectively. Meanwhile, the user query 111 (labeled as "Q" in the FIGS.) may be also input into the single-modal data fusing modules 411-41n. The single-modal data fusing modules 411-41n may be provided for the user query 111 and the single-modal data D11-D1n to perform the single-modal data fusing processing including a similarity matching calculation and generate a single-modal fused data. The single-modal fused data may contain a first similarity information of the similarity between the user query and the single-modal data and the content information of the user query and the single-modal data.

The generated single-modal fused data may be input into the multi-modal data fusing module 410 to be subjected to a multi-modal data fusing processing to generate a multi-modal fused data. Each single-modal fused data contains the similarity information on the similarity between each single-modal data and the user query, and thus the multi-modal fused data may contain the similar information on the similarity between the user query and the multi-modal tuples after the single-modal fused data are fused into the multi-modal fused data. That is to say, the similarity information may show the similarity between the user query and the whole multi-modal tuple.

As shown in FIG. 4, the blocks 4071-407m may perform the same data fusing processing on each of the multi-modal tuples 1131-113m respectively to generate m multi-modal fused data and input the generated multi-modal fused data into the similarity ranking module 402. The similarity ranking module 402 may generate similarity ranks of the multi-modal tuples 1131-113m according to the similarity information included in the multi-modal fused data.

Finally, the outputting module may select one or more multi-modal tuples as output according to a preset strategy and results of similarity ranking, and then generate the multi-modal response 114a according to the selected multi-modal tuples.

Figure 5:
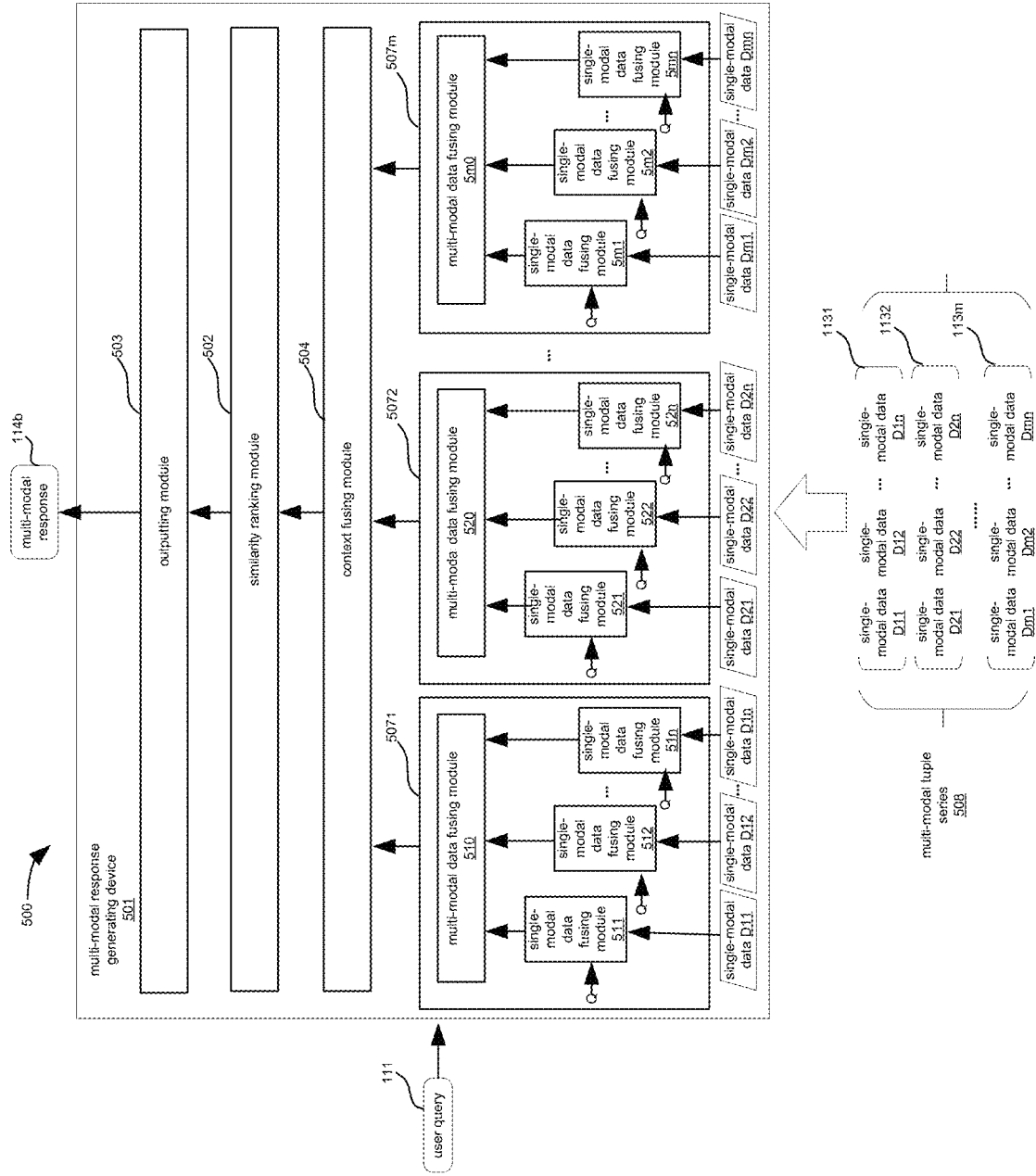
FIG. 5 is a schematic block diagram showing another exemplary multi-modal response generating device according to the embodiments of the present disclosure.

As shown in FIG. 5, which is a schematic block diagram 500 showing another exemplary multi-modal response generating device according to the embodiments of the present disclosure, another internal structure of the multi-modal response generating device 501 is shown in FIG. 5, and the multi-modal response generating device 501 shown in FIG. 5 is same as the multi-modal response generating device shown in FIG. 4 except that a context fusing module 504 is further included in the multi-modal response generating device 501. Furthermore, the input plurality of multi-modal tuples 1131-113m may have context sequential relationship therebetween. For example, a video may be clipped into a plurality of video clips in a order of playing, and then a plurality of multi-modal tuples 1131-113m may be generated according to such plurality of video clips, and thus the video clips may have some context sequential relationship therebetween and accordingly the multi-modal tuples 1131-113m may have a context sequential relationship therebetween. In FIG. 5, a multi-modal tuple series 508 consisted of the plurality of multi-modal tuples 1131-113m with context sequential relationship therebetween may be input into the multi-modal response generating device 501.

Similarly with the structure shown in FIG. 4, the modules contained in the blocks 5071-507m shown in FIG. 5 are same with each other in both structure and function. Therefore, the modules in the blocks 5071-507m may be combined together and perform processings on the input plurality of multi-modal tuples circularly. That is to say, the plurality of multi-modal tuples may be subjected to the processings by using the structure of the module in any block among the blocks 5071-507m. To better illustrate the processing on the plurality of multi-modal tuples by each module, the description may be made still by using the state in which the blocks 5071-507m are arranged in parallel as shown in FIG. 5.

The data fusing processing shown in the blocks 5071-507m in FIG. 5 may be same with the data fusing processing shown in the blocks 4071-407m in FIG. 4. In FIG. 5, after a plurality multi-modal fused data are generated in the blocks 5071-507m, the plurality of multi-modal fused data may be input into the context fusing module 504. For better clarification, the data fusing processing performed on each single-modal fused data by the multi-modal data fusing module 510 may be referred as a first multi-modal data fusing processing, and the generated fused data may be referred as a first multi-modal fused data. After the plurality of multi-modal fused data are input into the context fusing module 504, the context fusing module 504 may perform a second multi-modal data fusing processing on the plurality of multi-modal fused data according to the context sequential relationship among the plurality of multi-modal tuples to generate a plurality of second multi-modal fused data. The second multi-modal fused data may contain a second similarity information on the similarity between the user query and the multi-modal tuples, which are generated after the context sequential relationship is introduced therein.

Then, the similarity ranking module 502 may generate a similarity rank of the plurality of multi-modal tuples 1131-113m according to the second similarity information contained in the second multi-modal fused data.

Finally, the outputting module 503 may determine one or more multi-modal tuples according to a preset strategy and the result of the similarity ranking, and then generate a multi-modal response 114b according to the determined multi-modal tuples. More particularly, as an outputting way, a beginning multi-modal tuple and an ending multi-modal tuple of the plurality of multi-modal tuples necessary to be output may be determined according to the size and distribution of the second similarity information, and thus a beginning video clip and an ending video clip necessary to be output may be determined. Then, all the video clips between the beginning video clip and the ending video clip may be output as the multi-modal response.

In the multi-modal response generating device as shown in FIG. 5, the context sequential relationship is introduced into the data fusing processing, so that the similarity between the user query and the multi-modal tuple may be determined more reasonably and thus a more suitable multi-modal response may be provided to the user.

In the multi-modal response generating device as shown in FIG. 4 and FIG. 5, the multi-modal response may be generated by performing processing on the videos obtained by using the video searching engine as shown in FIG. 1. The video searching engine 102 as shown in FIG. 1 may be further used as one module, e.g., a video searching module, in a multi-modal response generating device to perform searching in a video searching engine according to the user query, so as to obtain a plurality of videos related to the user query. Accordingly, the multi-modal response generating device may further include a multi-modal tuple generating module configured to perform clipping on a video to obtain a plurality of video clips and generate a plurality of multi-modal tuples based on the plurality of video clips.

In the situation as shown in FIG. 2, a plurality of multi-modal tuples have been generated after a huge amount of videos have been subjected to a processing, and the generated plurality of multi-modal tuples may be saved in a database. In such case, the multi-modal response generating device may further include a multi-modal tuple acquiring module configured to perform searching in a multi-modal tuple database and obtain a plurality of multi-modal tuples related to the user query.

The multi-modal response devices as shown in FIG. 4 and FIG. 5 may be implemented by using a trained machine learning model. More particularly, the single-modal data fusing module and the multi-modal data fusing module described above may be implemented all or partly based on an algorithm model such as Concatenation Fusion, Element-Wise Product, Bilinear Pooling. The context fusing module may be implemented all or partly based on an algorithm model such as CNN (Convolutional neural network), RNN (Recurrent neural network), Transformer. More particularly, in the RNN model, the context fusing module may be formed by using the Bi-LSTM (bidirectional Long short-term memory) model.

Description would be made on the training on the machine learning model with an example of forming a data source of the multi-modal tuples by using videos. The training data of the machine learning model described above may be obtained from various data sources as shown in FIG. 1. After the videos in such video sources are clipped into video clips, corresponding multi-modal tuples may be generated and simulation may be made according to the content of these video clips to generate the user query artificially or extract the user query from a subtitle text corresponding to a video clip. A supervised training may be made on the machine learning model by using the multi-modal tuples and corresponding user query as the training data. The training is mainly used to continually improve the accuracy of the determination of the machine learning model on the similarity between the user query and the multi-modal tuples.

Description has been made on the multi-modal response generating apparatus according to the embodiments of the present disclosure, and the functions performed by the multi-modal response generating apparatus described above may be implemented by the multi-modal response generating method as explained below.

Illustrative Processing

Figure 6:
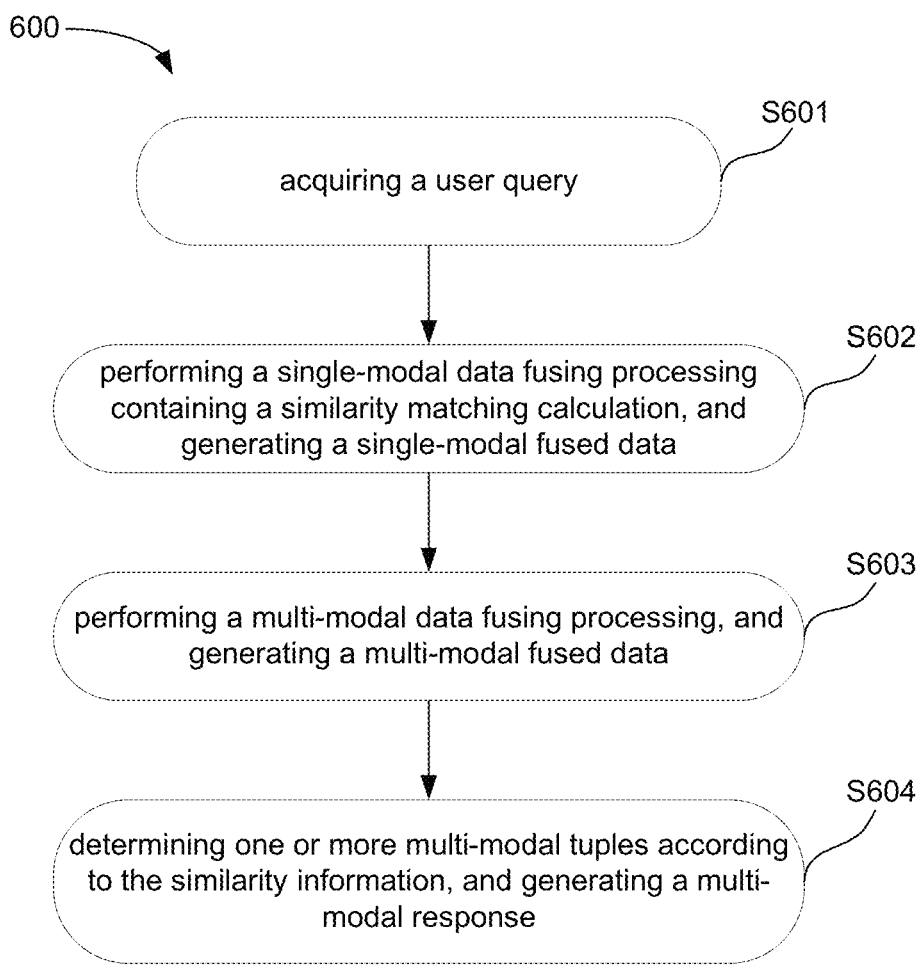
FIG. 6 is a schematic flowchart showing an illustrative processing of a multi-modal response generating method according to the embodiments of the present disclosure.

As shown in FIG. 6, which is a schematic flowchart 600 showing an illustrative processing of a multi-modal response generating method according to the embodiments of the present disclosure, the processing may include the following steps.

S601, acquiring a user query. The user query may be from an information input of a user in the human-machine conversation as shown in FIG. 3, or from an information input other than the conversation interface. For example, a user may input a piece of information in voice by using a mobile terminal, and such inputting may make a chatbot in the mobile terminal generate a user query and then the subsequent processing for generating multi-modal response may be followed.

Upon a user query is acquired, the user query and a plurality of multi-modal tuples may be input into a multi-modal response generating model, which may adopt the structure of the multi-modal response generating device shown in FIG. 4 or FIG. 5, and then the following steps may be performed.

S602, performing a single-modal data fusing processing containing a similarity matching calculation on the user query and each single-modal data in the plurality of the multi-modal tuples, and generating a single-modal fused data. The single-modal fused data may contain a first similarity information on the similarity between the user query and the single-modal data.

S603, performing a multi-modal data fusing processing on a plurality of single-modal fused data corresponding to each multi-modal tuple, and generating a multi-modal fused data. The multi-modal fused data may contain a similarity information on the similarity between the user query and the multi-modal tuples.

S604, determining one or more multi-modal tuples according to the similarity information on the similarity between the user query and the multi-modal tuples, and generating a multi-modal response according to the selected multi-modal tuples.

Figure 7:
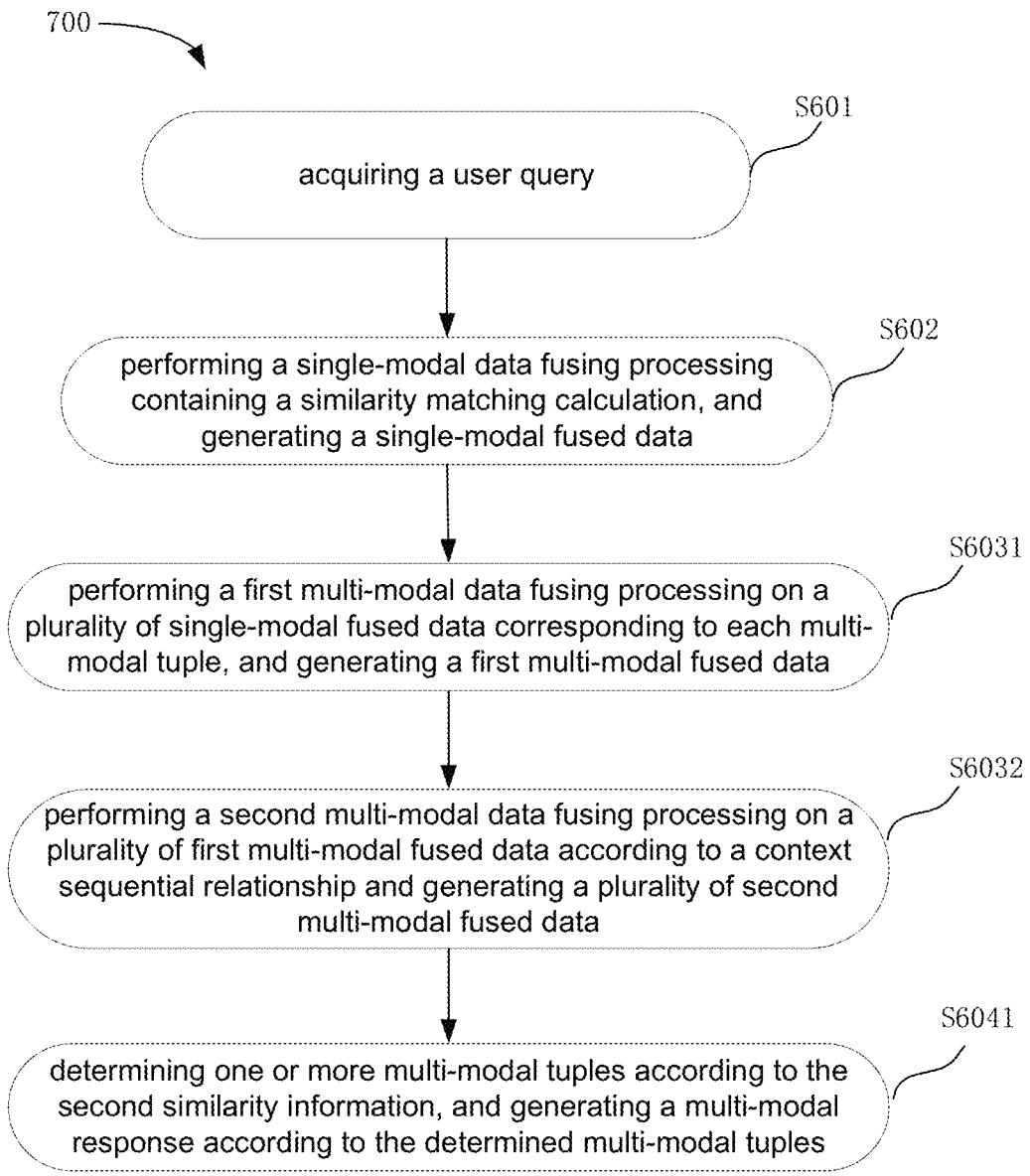
FIG. 7 is a schematic flowchart showing another illustrative processing of a multi-modal response generating method according to the embodiments of the present disclosure.

As shown in FIG. 7, which is a schematic flowchart 700 showing another illustrative processing of a multi-modal response generating method according to the embodiments of the present disclosure, the processing shown in FIG. 7 is same as the processing shown in FIG. 6, except that the processing shown in FIG. 7 further include the following steps.

S6031, performing a first multi-modal data fusing processing on a plurality of single-modal fused data corresponding to each multi-modal tuple, and generating a first multi-modal fused data. The first multi-modal fused data may contain a first similarity information on similarity between the user query and the multi-modal tuples.

S6032, performing a second multi-modal data fusing processing on a plurality of first multi-modal fused data according to a context sequential relationship and generating a plurality of second multi-modal fused data.

The second multi-modal fused data may contain a second similarity information on similarity between the user query and the multi-modal tuples after the context sequential relationship is introduced.

Correspondingly, the step of S604 described above may be a step of S6041 of determining one or more multi-modal tuples according to the second similarity information, and generating a multi-modal response according to the determined multi-modal tuples.

Furthermore, the multi-modal tuple described above may be obtained by the extracting processing on videos. The multi-modal tuple may include a triple data consisted of a dynamic image clip, an audio clip, and a subtitle. More particularly, the dynamic image clip, the audio clip, and the subtitle are all generated based on a same video clip, and thus they are correlated with each other. Before the processing shown in FIG. 6 or FIG. 7, the method may further include a processing of acquiring a multi-modal tuple associated with the user query.

Figure 8:
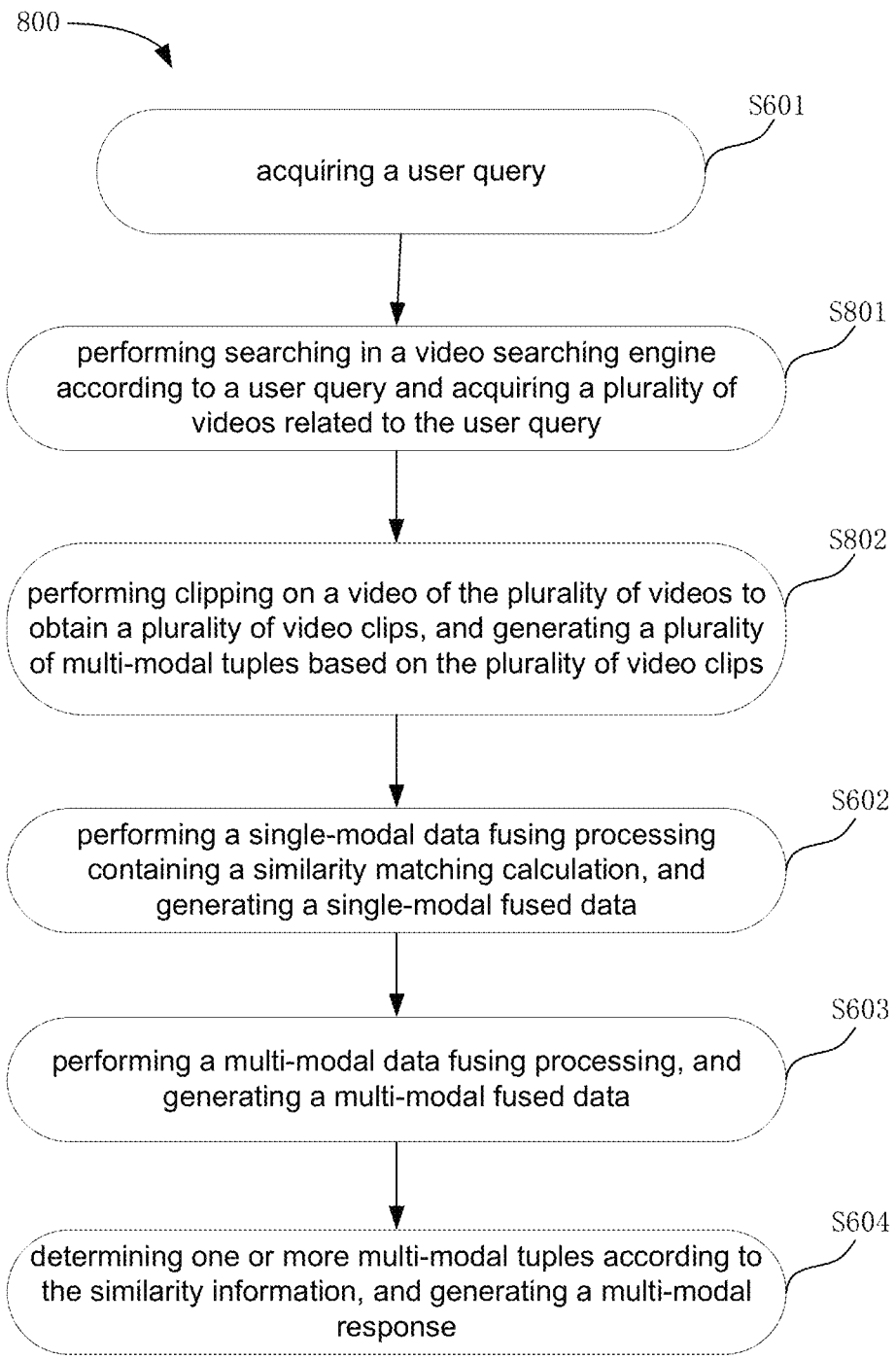
FIG. 8 is a schematic flowchart showing still another illustrative processing of a multi-modal response generating method according to the embodiments of the present disclosure.

As shown in FIG. 8, which is a schematic flowchart 800 showing still another illustrative processing of a multi-modal response generating method according to the embodiments of the present disclosure, the processing shown in FIG. 8 is same as the processing shown in FIG. 6 or FIG. 7, except that the processing shown in FIG. 8 may further include the following steps.

S801, performing searching in a video searching engine according to a user query and acquiring a plurality of videos related to the user query.

S802, performing clipping on a video of the plurality of videos to obtain a plurality of video clips, and generating a plurality of multi-modal tuples based on the plurality of video clips.

In the processing shown in FIG. 8, the multi-modal tuples may be acquired by obtaining original videos from an on-line video searching engine and extracting the multi-modal tuples by performing processing on the videos. In some embodiments, processing may be made on a huge amount of videos to generate the multi-modal tuples and save the generated multi-modal tuples in a database, and some label information may be provided to the multi-modal tuples. When a user query is acquired, searching may be made in a database with the multi-modal tuples stored therein according to the user query, and acquiring a plurality of multi-modal tuples related to the user query as an input to the multi-modal response generating model.

Furthermore, one or more video clips may be output directly as the multi-modal response or corresponding summary information may be attached while the video clips are output so that it may be easy for the users to acknowledge the content of the response roughly.

It should be noted that, the multi-modal response generating method described above may be implemented based on the above multi-modal response generating apparatus, or implemented independently as a procedure of processing method, or implemented by using other software or hardware design under the technical idea of the embodiments of the present disclosure.

Description has been made on the processes of the multi-modal response generating method according to the embodiments of the invention in the above, and the technical details and corresponding technical effects thereof are described in detail in the preceding introduction on the processing devices, and repeated description may be omitted to avoid redundancy.

Implementation Example of Electronic Apparatus

The electronic apparatus according to embodiments of the present disclosure may be a mobile electronic apparatus, or an electronic apparatus with less mobility or a stationary computing apparatus. The electronic apparatus according to embodiments of the present disclosure may at least include a processor and a memory. The memory may store instructions thereon and the processor may obtain instructions from the memory and execute the instructions to cause the electronic apparatus to perform operations.

In some examples, one or more components or modules and one or more steps as shown in FIG. 1 to FIG. 8 may be implemented by software, hardware, or in combination of software and hardware. For example, the above component or module and one or more steps may be implemented in system on chip (SoC). Soc may include: integrated circuit chip, including one or more of processing unit (such as center processing unit (CPU), micro controller, micro processing unit, digital signal processing unit (DSP) or the like), memory, one or more communication interface, and/or other circuit for performing its function and alternative embedded firmware.

Figure 9:
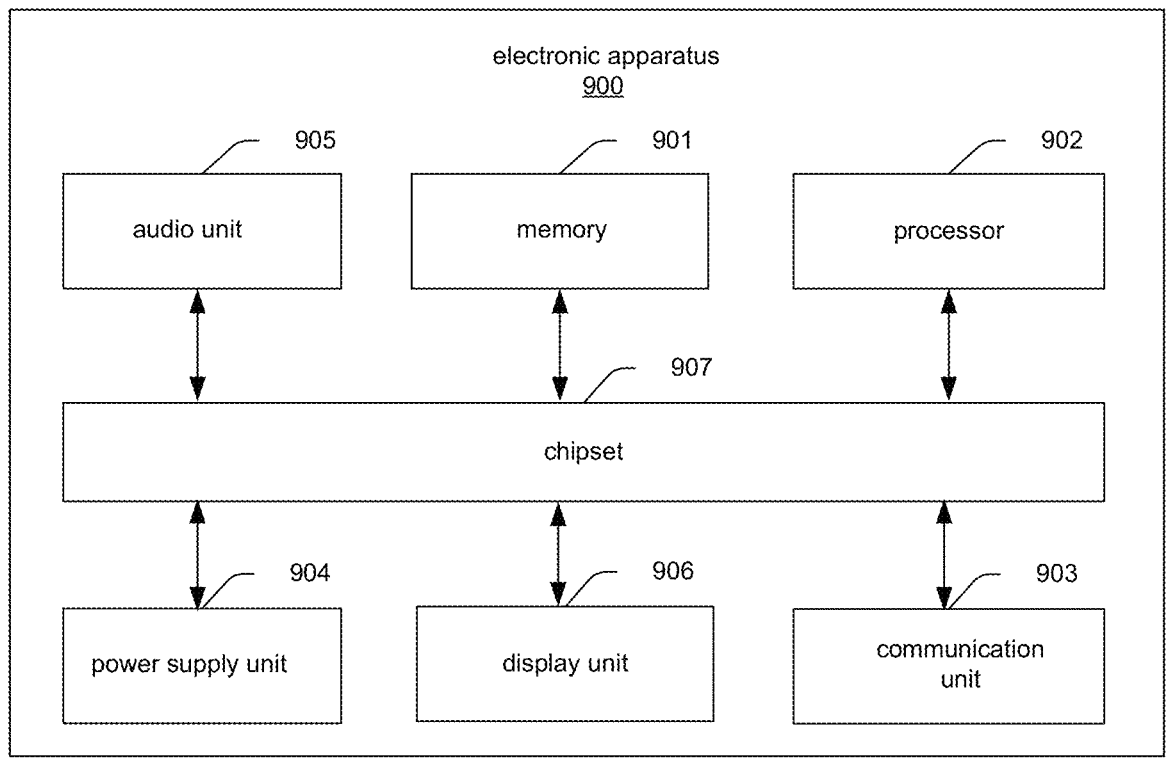
FIG. 9 is a structural block diagram of an exemplary mobile electronic apparatus.

As shown in FIG. 9, which is a structural block diagram of an exemplary mobile electronic apparatus 900. The electronic apparatus 900 may be a small portable (or mobile) electronic apparatus. The small portable (or mobile) electronic apparatus may be e.g., a cell phone, a personal digital assistant (PDA), a personal media player device, a wireless network player device, personal headset device, an IoT (internet of things) intelligent device, a dedicate device or combined device containing any of functions described above. The electronic apparatus 900 may at least include a memory 901 and a processor 902.

The memory 901 may be configured to store programs. In addition to the above programs, the memory 901 may be configured to store other data to support operations on the electronic apparatus 900. The examples of these data may include instructions of any applications or methods operated on the electronic apparatus 900, contact data, phone book data, messages, pictures, videos, and the like.

The memory 901 may be implemented by any kind of volatile or nonvolatile storage device or their combinations, such as static random access memory (SRAM), electronically erasable programmable read-only memory (EE-PROM), erasable programmable read-only memory (EPROM), programmable read-only memory (PROM), read-only memory (ROM), magnetic memory, flash memory, disk memory, or optical disk.

The memory 901 may be coupled to the processor 902 and contain instructions stored thereon. The instructions may cause the electronic apparatus 900 to perform operations upon being executed by the processor 902, the operations may include: implement the related processing procedures performed in the corresponding examples shown in FIG. 6 to FIG. 8, or processing logics performed by the apparatus, system, and user interface shown in FIG. 1 to FIG. 5.

Detailed description has been made on the above operations in the above embodiments of method and device. The description on the above operations may be applied to electronic apparatus 900. That is to say, the specific operations mentioned in the above embodiments may be recorded in memory 901 in program and be performed by processor 902.

Furthermore, as shown in FIG. 9, the electronic apparatus 900 may further include: a communication unit 903, a power supply unit 904, an audio unit 905, a display unit 906, chipset 907, and other units. Only part of units are exemplarily shown in FIG. 9 and it is obvious to one skilled in the art that the electronic apparatus 900 only includes the units shown in FIG. 9.

The communication unit 903 may be configured to facilitate wireless or wired communication between the electronic apparatus 900 and other apparatuses. The electronic apparatus may be connected to wireless network based on communication standard, such as WiFi, 2G, 3G, or their combination. In an exemplary example, the communication unit 903 may receive radio signal or radio related information from external radio management system via radio channel. In an exemplary example, the communication unit 903 may further include near field communication (NFC) module for facilitating short-range communication. For example, the NFC module may be implemented with radio frequency identification (RFID) technology, Infrared data association (IrDA) technology, ultra wideband (UWB) technology, Bluetooth (BT) technology and other technologies.

The power supply unit 904 may be configured to supply power to various units of the electronic device. The power supply unit 904 may include a power supply management system, one or more power supplies, and other units related to power generation, management, and allocation.

The audio unit 905 may be configured to output and/or input audio signals. For example, the audio unit 905 may include a microphone (MIC). When the electronic apparatus in an operation mode, such as calling mode, recording mode, and voice recognition mode, the MIC may be configured to receive external audio signals. The received audio signals may be further stored in the memory 901 or sent via the communication unit 903. In some examples, the audio unit 905 may further include a speaker configured to output audio signals.

The display unit 906 may include a screen, which may include liquid crystal display (LCD) and touch panel (TP). If the screen includes a touch panel, the screen may be implemented as touch screen so as to receive input signal from users. The touch panel may include a plurality of touch sensors to sense touching, sliding, and gestures on the touch panel. The touch sensor may not only sense edges of touching or sliding actions, but also sense period and pressure related to the touching or sliding operations.

The above memory 901, processor 902, communication unit 903, power supply unit 904, audio unit 905 and display unit 906 may be connected with the chipset 907. The chipset 907 may provide interface between the processor 902 and other units of the electronic apparatus 900. Furthermore, the chipset 907 may provide interface for each unit of the electronic apparatus 900 to access the memory 901 and communication interface for accessing among units.

In some examples, one or more modules, one or more steps, or one or more processing procedures involved in FIGS. 1 to 8 may be implemented by a computing device with an operating system and hardware configuration.

Figure 10:
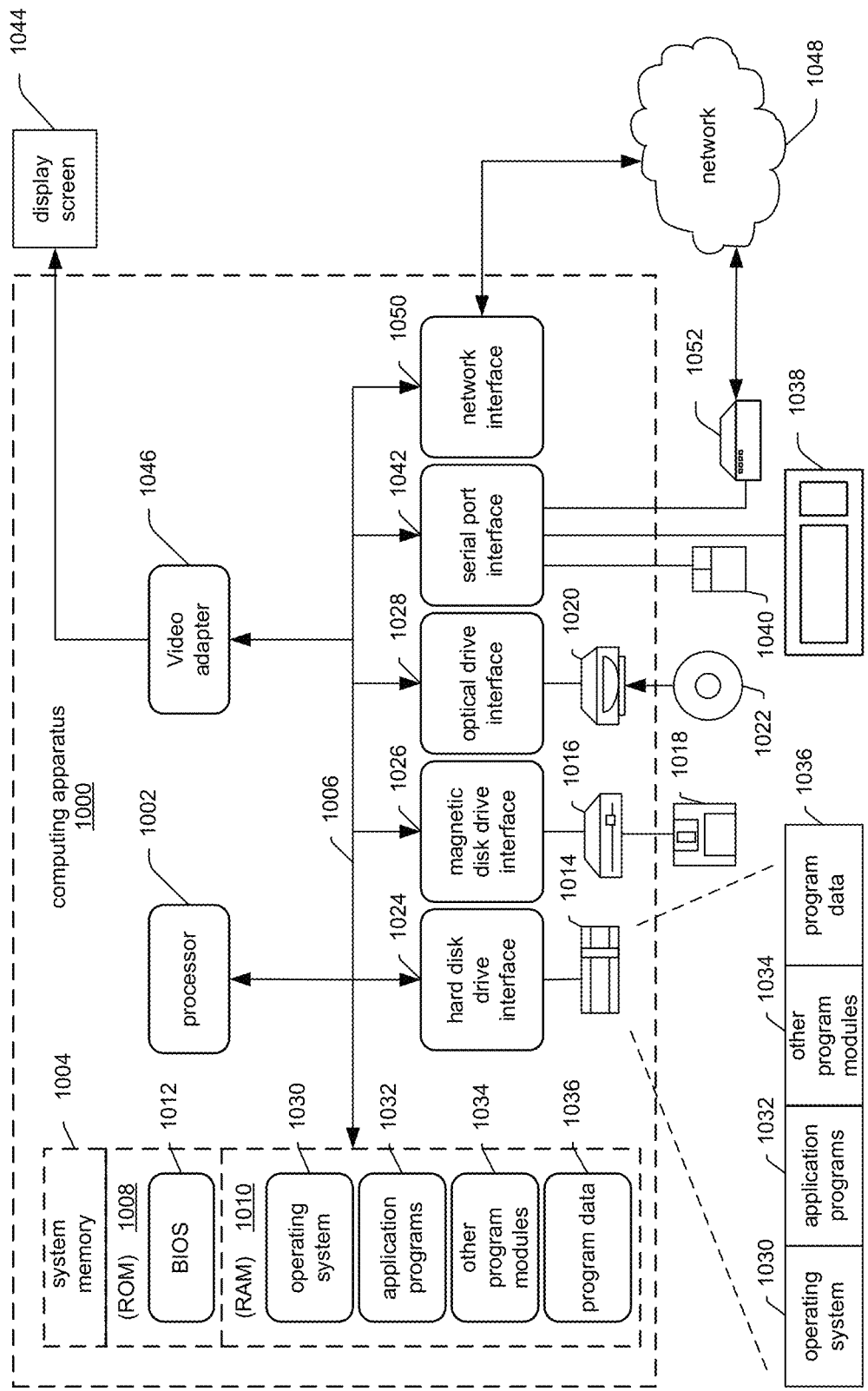
FIG. 10 is a structural block diagram of an exemplary computing apparatus.

FIG. 10 is a structural block diagram of an exemplary computing apparatus 1000. The description of computing apparatus 1000 provided herein is provided for purposes of illustration, and is not intended to be limiting. Embodiments may be implemented in further types of computer systems, as would be known to persons skilled in the relevant art(s).

As shown in FIG. 10, the computing apparatus 1000 includes one or more processors 1002, a system memory 1004, and a bus 1006 that couples various system components including system memory 1004 to processor 1002. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008, and random access memory (RAM) 1010. A basic input/output system 1012 (BIOS) is stored in ROM 1008.

The computing apparatus 1000 also has one or more of the following drives: a hard disk drive 1010 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1010, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, RAMS, ROMs, and the like.

A number of program modules may be stored on the hard disk, magnetic disk, optical disk, ROM, or RAM. These programs include an operating system 1030, one or more application programs 1032, other program modules 1034, and program data 1036. These programs may include, for example, computer program logic (e.g., computer program code or instructions) for implementing processing procedures performed in the corresponding examples shown in FIG. 6 to FIG. 8, or processing logics performed by the TTS processing device shown in FIG. 1 to FIG. 5.

A user may enter commands and information into computing apparatus 1000 through input devices such as a keyboard 1038 and a pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices may be connected to processor 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing apparatus 1000. Display screen 1044 may display information, as well as being a user interface for receiving user commands and/or other information (e.g., by touch, finger gestures, virtual keyboard, etc.). In addition to display screen 1044, the computing apparatus 1000 may include other peripheral output devices (not shown) such as speakers and printers.

The computing apparatus 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to generally refer to media such as the hard disk associated with hard disk drive 1010, removable magnetic disk 1018, removable optical disk 1022, system memory 1004, flash memory cards, digital video disks, RAMs, ROMs, and further types of physical/tangible storage media. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1032 and other program modules 1034) may be stored on the hard disk, magnetic disk, optical disk, ROM, or RAM. Such computer programs may also be received via network interface 1050, serial port interface 1042, or any other interface type. Such computer programs, when executed or loaded by an application, enable computing apparatus 1000 to implement features of embodiments discussed herein. Accordingly, such computer programs represent controllers of the computing apparatus 1400.

As such, embodiments are also directed to computer program products including computer instructions/code stored on any computer usable storage medium. Such code/instructions, when executed in one or more data processing devices, causes a data processing device(s) to operate as described herein. Examples of computer-readable storage devices that may include computer readable storage media include storage devices such as RAM, hard drives, floppy disk drives, CD ROM drives, DVD ROM drives, zip disk drives, tape drives, magnetic storage device drives, optical storage device drives, MEMs devices, nanotechnology-based storage devices, and further types of physical/tangible computer readable storage devices.

Example Clauses

A. A method, including:
acquiring a user query;
inputting the user query and a plurality of multi-modal tuples into a multi-modal response generating model;
performing a single-modal data fusing processing containing a similarity matching calculation on the user query and each single-modal data in each of the plurality of the multi-modal tuples, and generating a single-modal fused data, the single-modal fused data contains a first similarity information on the similarity between the user query and the single-modal data;
performing a multi-modal data fusing processing on a plurality of single-modal fused data corresponding to each multi-modal tuple, and generating a multi-modal fused data, the multi-modal fused data contains a similarity information on the similarity between the user query and the multi-modal tuples; and
determining one or more multi-modal tuples for generating a multi-modal response according to the similarity information on the similarity between the user query and the multi-modal tuples, and generating a multi-modal response according to the determined multi-modal tuples.

B. The method according to paragraph A, wherein the plurality of multi-modal tuples input into the multi-modal response generating model include a context sequential relationship therebetween, the performing a multi-modal data fusing processing on a plurality of single-modal fused data corresponding to each multi-modal tuple and generating a multi-modal fused data includes:

performing a first multi-modal data fusing processing on a plurality of single-modal fused data corresponding to each multi-modal tuple, and generating a first multi-modal fused data, the first multi-modal fused data contains a first similarity information on similarity between the user query and the multi-modal tuples performing a second multi-modal data fusing processing on a plurality of first multi-modal fused data according to a context sequential relationship and generating a plurality of second multi-modal fused data, the second multi-modal fused data contains a second similarity information on similarity between the user query and the multi-modal tuples after the context sequential relationship is introduced, the determining one or more multi-modal tuples for generating a multi-modal response according to the similarity information on the similarity between the user query and the multi-modal tuples includes:

determining one or more multi-modal tuples for generating a multi-modal response according to the second similarity information.

C. The method according to paragraph A, wherein before the inputting the user query and a plurality of multi-modal tuples into a multi-modal response generating model, the method further includes:

performing searching in a video searching engine according to a user query and acquiring a plurality of videos related to the user query as an input to the multi-modal response generating model.

D. The method according to paragraph A, wherein, the multi-modal tuple includes a triple data consisted of a dynamic image clip, an audio clip, and a subtitle which are correlated with each other.

E. The method according to paragraph D, wherein before the inputting the user query and a plurality of multi-modal tuples into a multi-modal response generating model, the method further includes:

performing searching in a video searching engine according to a user query and acquiring a plurality of videos related to the user query; and performing clipping on a video of the plurality of videos to obtain a plurality of video clips, and generating a plurality of multi-modal tuples based on the plurality of video clips.

F. The method according to paragraph E, wherein the multi-modal response includes one or more video clips and summary information corresponding to the one or more video clips.

G. A device, including:

a plurality of single-modal data fusing modules, configured to perform a single-modal data fusing processing containing a similarity matching calculation on an acquired user query and each single-modal data in each multi-modal tuple of a plurality of multi-modal tuples, and generate a single-modal fused data, the single-modal fused data contains a first similarity information on the similarity between the user query and the single-modal data;

a multi-modal data fusing module, configured to perform a multi-modal data fusing processing on a plurality of single-modal fused data corresponding to each multi-modal tuple, and generate a multi-modal fused data, the multi-modal fused data contains a similarity information on the similarity between the user query and the multi-modal tuples;

a similarity ranking module, configured to perform ranking on the similarity information on the similarity between the user query and the multi-modal tuples, and determine one or more multi-modal tuples for generating a multi-modal response according to the result of the ranking on the similarity information; and an outputting module, configured to generate a multi-modal response according to the determined one or more multi-modal tuples.

H. The device according to paragraph G, wherein the plurality of multi-modal tuples include a context sequential relationship therebetween, and the device further includes a context fusing module, the multi-modal data fusing module is further configured to perform a first multi-modal data fusing processing on a plurality of single-modal fused data corresponding to each multi-modal tuple, and generate a first multi-modal fused data, the first multi-modal fused data contains a first similarity information on similarity between the user query and the multi-modal tuples;

the context fusing module is configured to perform a second multi-modal data fusing processing on a plurality of first multi-modal fused data according to a context sequential relationship and generate a plurality of second multi-modal fused data, the second multi-modal fused data contains a second similarity information on similarity between the user query and the multi-modal tuples after the context sequential relationship is introduced, the similarity ranking module is further configured to perform ranking on the second similarity information on similarity between the user query and the multi-modal tuples, and determine one or more multi-modal tuples for generating a multi-modal response according to the result of the ranking on the second similarity information.

I. The device according to paragraph G, wherein the device further includes:

a multi-modal acquiring module, configured to perform searching in a database of the multi-modal tuples according to the user query and acquire a plurality of multi-modal tuples related to the user query.

J. The device according to paragraph G, wherein the multi-modal tuple includes a triple data consisted of a dynamic image clip, an audio clip, and a subtitle which are correlated with each other.

K. The device according to paragraph G, wherein the device further includes:

a video searching module configured to perform searching in a video searching engine according to a user query and acquire a plurality of videos related to the user query;

a multi-modal tuple generating module configured to perform clipping on the video to obtain a plurality of video clips, and generate a plurality of multi-modal tuples based on the plurality of video clips.

L. The device according to paragraph K, wherein the multi-modal response includes one or more video clips and a summary information corresponding to the one or more video clips.

M. An electronic apparatus, including:

a processing unit; and a memory, coupled to the processing unit and containing instructions stored thereon, the instructions cause the electronic apparatus to perform operations upon being executed by the processing unit, the operations include:

acquiring a user query;

inputting the user query and a plurality of multi-modal tuples into a multi-modal response generating model;

performing a single-modal data fusing processing containing a similarity matching calculation on the user query and each single-modal data in each of the plurality of the multi-modal tuples, and generating a single-modal fused data, the single-modal fused data contains a first similarity information on the similarity between the user query and the single-modal data;

performing a multi-modal data fusing processing on a plurality of single-modal fused data corresponding to each multi-modal tuple, and generating a multi-modal fused data, the multi-modal fused data contains a similarity information on the similarity between the user query and the multi-modal tuples;

determining one or more multi-modal tuples for generating a multi-modal response according to the similarity information on the similarity between the user query and the multi-modal tuples, and generating a multi-modal response according to the determined multi-modal tuples.

N. The electronic apparatus according to paragraph M, wherein the plurality of multi-modal tuples input into the multi-modal response generating model include a context sequential relationship therebetween, the performing a multi-modal data fusing processing on a plurality of single-modal fused data corresponding to each multi-modal tuple, and generating a multi-modal fused data includes:

performing a first multi-modal data fusing processing on a plurality of single-modal fused data corresponding to each multi-modal tuple, and generating a first multi-modal fused data, the first multi-modal fused data contains a first similarity information on similarity between the user query and the multi-modal tuples performing a second multi-modal data fusing processing on a plurality of first multi-modal fused data according to a context sequential relationship and generating a plurality of second multi-modal fused data, the second multi-modal fused data contains a second similarity information on similarity between the user query and the multi-modal tuples after the context sequential relationship is introduced, the determining one or more multi-modal tuples for generating a multi-modal response according to the similarity information on the similarity between the user query and the multi-modal tuples includes:

determining one or more multi-modal tuples for generating a multi-modal response according to the second similarity information.

O. The electronic apparatus according to paragraph M, wherein before the inputting the user query and a plurality of multi-modal tuples into a multi-modal response generating model, the operations further include:

performing searching in a video searching engine according to a user query and acquiring a plurality of videos related to the user query as an input to the multi-modal response generating model.

P. The electronic apparatus according to paragraph M, wherein, the multi-modal tuple includes a triple data consisted of a dynamic image clip, an audio clip, and a subtitle which are correlated with each other.

Q. The electronic apparatus according to paragraph P, wherein before the inputting the user query and a plurality of multi-modal tuples into a multi-modal response generating model, the method further includes:

performing searching in a video searching engine according to a user query and acquiring a plurality of videos related to the user query; and performing clipping on a video of the plurality of videos to obtain a plurality of video clips, and generating a plurality of multi-modal tuples based on the plurality of video clips.

R. The electronic apparatus according to paragraph Q, wherein the multi-modal response includes one or more video clips and summary information corresponding to the one or more video clips.

CONCLUSION

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and nonvolatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation", "one implementation", "some implementations", or "other implementations" may mean that a particular feature, structure, or characteristic described in connection with one or more implementations may be included in at least some implementations, but not necessarily in all implementations. The various appearances of "an implementation", "one implementation", or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

Conditional language such as, among others, "can," "could," "might" or "may," unless specifically stated otherwise, are otherwise understood within the context as used in general to present that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims It would be obvious to one skilled in the art that, all or part of steps for implementing the above embodiments may be accomplished by hardware related to programs or instructions. The above program may be stored in a computer readable storing medium. Such program may perform the steps of the above embodiments upon being executed. The above storing medium may include: ROM, RAM, magnetic disk, or optic disk or other medium capable of storing program codes.

It should be noted that the foregoing embodiments are merely used to illustrate the technical solution of the present disclosure, and not to limit the present disclosure. Although the present disclosure has been described in detail with reference to the foregoing embodiments, one skilled in the art would understand that the technical solutions recited in the foregoing embodiments may be modified or all or a part of the technical features may be replaced equally. These modifications and replacements are not intended to make corresponding technical solution depart from the scope of the technical solution of embodiments of the present disclosure.

The invention claimed is:

1. A computing device comprising:
  a hardware processor;
  a memory, the memory storing instructions, which when executed, cause the hardware processor to perform operations comprising:
  acquiring, from a conversational artificial intelligence session with a user, a user query;
  performing a similarity matching calculation between the user query and each of a plurality of components of a first video, the components comprising audio, image, and subtitle data corresponding to the first video to create a plurality of first similarity scores, each of the plurality of first similarity scores describing a similarity between the user query and a single one of the plurality of components of the first video;
  combining the plurality of first similarity scores to generate a combined similarity score;
  selecting a video from a plurality of videos based upon the combined similarity score of the first video and a plurality of other combined similarity scores of other videos in the plurality of videos;
  generating a query response including the selected video;
  generating summary information of the selected video; and
  causing the query response to be output on a display device of the user as part of a response to the user query in the conversational artificial intelligence session, the output including the selected video and including the summary information of the selected video.

2. The computing device of claim 1, wherein the operations further comprise: performing a search in a video search engine to acquire the first video related to the user query prior to performing the similarity matching calculation.

3. The computing device of claim 1, wherein the operations further comprise: performing a segmentation process on a video to obtain a series of video clips, the first video being one of the series of video clips.

4. The computing device of claim 1, wherein the summary information includes a textual description of the content of the selected video, the textual description being generated based on the subtitle data of the selected video.

5. The computing device of claim 1, wherein the operations further comprise: ranking the combined similarity score of the first video against combined similarity scores of additional videos, and wherein the selecting of the video is based on the ranking.

6. The computing device of claim 1, wherein the operations further comprise: extracting feature vectors from the audio, image, and subtitle data of the first video, and wherein the similarity matching calculation is performed using the extracted feature vectors.

7. The computing device of claim 1, wherein the operations further comprise: generating the query response to include a link to the selected video, wherein the link is actionable to play the selected video on the display device.

8. A method comprising:
  acquiring, from a conversational artificial intelligence session with a user, a user query;
  performing a similarity matching calculation between the user query and each of a plurality of components of a first video, the components comprising audio, image, and subtitle data corresponding to the first video to create a plurality of first similarity scores, each of the plurality of first similarity scores describing a similarity between the user query and a single one of the plurality of components of the first video;

combining the plurality of first similarity scores to generate a combined similarity score;
selecting a video from a plurality of videos based upon the combined similarity score of the first video and a plurality of other combined similarity scores of other videos in the plurality of videos;
generating a query response including the selected video;
generating summary information of the selected video; and
causing the query response to be output on a display device of the user as part of a response to the user query in the conversational artificial intelligence session, the output including the selected video and including the summary information of the selected video.

9. The method of claim 8, wherein the method further comprises: performing a search in a video search engine to acquire the first video related to the user query prior to performing the similarity matching calculation.

10. The method of claim 8, wherein the method further comprises: performing a segmentation process on a video to obtain a series of video clips, the first video being one of the series of video clips.

11. The method of claim 8, wherein the summary information includes a textual description of the content of the selected video, the textual description being generated based on the subtitle data of the selected video.

12. The method of claim 8, wherein the method further comprises: ranking the combined similarity score of the first video against combined similarity scores of additional videos, and wherein the selecting of the video is based on the ranking.

13. The method of claim 8, wherein the method further comprises: extracting feature vectors from the audio, image, and subtitle data of the first video, and wherein the similarity matching calculation is performed using the extracted feature vectors.

14. The method of claim 8, wherein the method further comprises: generating the query response to include a link to the selected video, wherein the link is actionable to play the selected video on the display device.

15. A non-transitory machine-readable medium, storing instructions, which when executed by a machine, cause the machine to perform operations comprising:
acquiring, from a conversational artificial intelligence session with a user, a user query;
performing a similarity matching calculation between the user query and each of a plurality of components of a first video, the components comprising audio, image, and subtitle data corresponding to the first video to create a plurality of first similarity scores, each of the plurality of first similarity scores describing a similarity between the user query and a single one of the plurality of components of the first video;
combining the plurality of first similarity scores to generate a combined similarity score;
selecting a video from a plurality of videos based upon the combined similarity score of the first video and a plurality of other combined similarity scores of other videos in the plurality of videos;
generating a query response including the selected video;
generating summary information of the selected video; and
causing the query response to be output on a display device of the user as part of a response to the user query in the conversational artificial intelligence session, the output including the selected video and including the summary information of the selected video.

16. The non-transitory machine-readable medium of claim 15, wherein the operations further comprise: performing a search in a video search engine to acquire the first video related to the user query prior to performing the similarity matching calculation.

17. The non-transitory machine-readable medium of claim 15, wherein the operations further comprise: performing a segmentation process on a video to obtain a series of video clips, the first video being one of the series of video clips.

18. The non-transitory machine-readable medium of claim 15, wherein the summary information includes a textual description of the content of the selected video, the textual description being generated based on the subtitle data of the selected video.

19. The non-transitory machine-readable medium of claim 15, wherein the operations further comprise: ranking the combined similarity score of the first video against combined similarity scores of additional videos, and wherein the selecting of the video is based on the ranking.

20. The non-transitory machine-readable medium of claim 15, wherein the operations further comprise: extracting feature vectors from the audio, image, and subtitle data of the first video, and wherein the similarity matching calculation is performed using the extracted feature vectors.

* * * * *